Aug. 31, 1954
A. C. PRESS
2,687,700
SLICING DEVICE
Filed Dec. 19, 1949
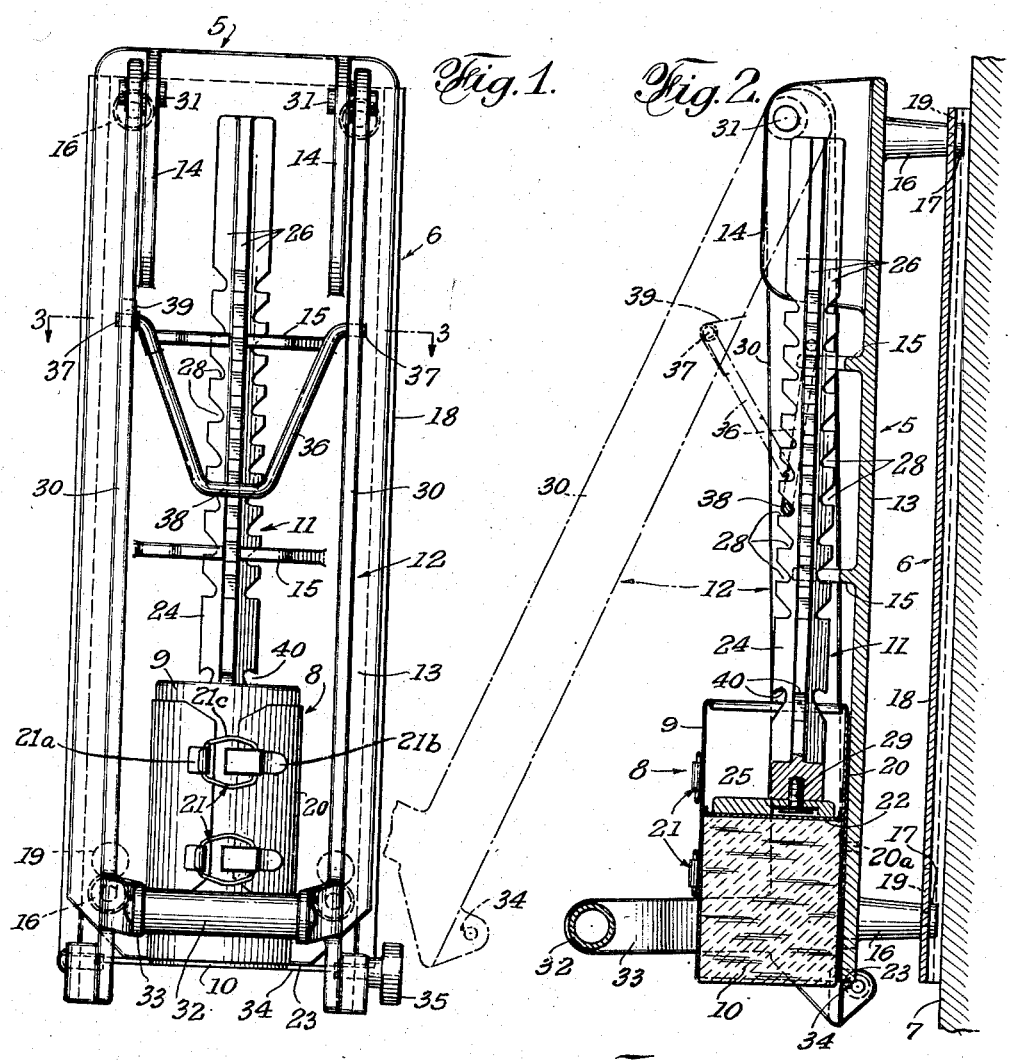
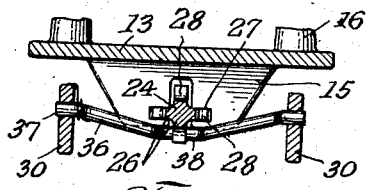
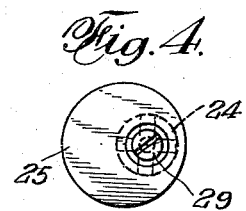
Inventor
ARTHUR C. PRESS
By C. G. Stratton
Attorney Patented Aug. 31, 1954

2,687,700

UNITED STATES PATENT OFFICE 2,687,700

SLICING DEVICE

Arthur C. Press, Compton, Calif.

Application December 19, 1949, Serial No. 133,789

4 Claims. (Cl. 107—20)

This invention relates to devices for slicing relatively soft materials such as ice cream and sherbet while the same are being extruded from a container thereof. Other materials such as butter and certain cheeses may be handled by the present device, as may later be seen. The term "ice cream" will be herein used to designate such soft materials generally.

An object of the present invention is to provide novel means which, by a single stroke of an operating member, will first extrude a desired amount of ice cream from a container and then sever the extruded portion from the body of ice cream in the container, the operation being accomplished without power means, merely by manual actuation.

Another object of the invention is to provide a device as indicated that, with equal facility, may be used in either horizontal or vertical position, or in any suitable intermediate angular position.

Another object of the invention is to provide, in a device of the character indicated, a selector element adapted to be variously positioned for obtaining slices or severed portions of varying thicknesses.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a front view of a slicing device embodying a preferred form of the present invention.

Fig. 2 is a longitudinal sectional view thereof.

Fig. 3 is a cross-sectional view as taken on line 3—3 of Fig. 1.

Fig. 4 is an end view of a thickness-selector and feed element employed in the device.

The slicing device that is illustrated comprises, generally, a base 5, means 6 for removably supporting said base as on a wall 7, clamp means 8 on the base, near one end thereof, for a container 9 of ice cream 10, a thickness-selector and feed element 11, guided for longitudinal movement on the base, and manually actuatable means 12 pivotally mounted on the base for first moving element 11 in a direction to extrude ice cream 10 outward of the container and then slicing through the extruded portion to sever the same from the body of ice cream in the container.

The base 5 may be variously made. As shown, the same comprises a metal casting formed to have a base plate 13 from the same side of which extends a pair of transversely spaced ears 14 at one end, and a pair of longitudinally spaced transverse guides 15 intermediate the ends of said plate. Four bosses 16 extend from the opposite side of base plate 13 and each carries at its end a stud 17.

The support means 6 comprises a plate 18 that is mounted on wall 7 in slightly spaced relation thereto. Said plate 18 is provided with slots 19 spaced according to bosses 16 and receptive of studs 17. The base 5 may be hung on plate 18 substantially in the manner shown and as easily removed therefrom. The upright position of the device that is shown is only one of the positions in which the same may be placed. The studs 17 may serve as feet for supporting the base in a horizontal position, as can be well understood.

At the end of base plate 13, opposite to the end having ears 14, is applied the clamp means 8. The latter is shown as a slitted sheet metal sleeve 20 arranged longitudinally of the base and affixed thereto as by rivets 20a, and one or more releasable clamp latches 21 separably connecting the edges of the sleeve that define the slit. Each clamp latch is shown as a hook 21a adjacent one sleeve edge, a swingable part 21b opposite said hook on the other sleeve edge, and a loop 21c, carried by said part to span across the slit and releasably connect with hook 21a. These latches are conventional toggle devices such as are used to hold closed the lids of trunks and suitcases, and are shown merely as exemplary means to separably connect the edges defining the slit in sleeve 20. The diameter of sleeve 20 is such that, when the latches 21 are applied, the same securely clamps container 9 to hold it fixed while the device is in operation. Said container is a conventional cylindrically tubular item that has a bottom 22 and a removable cap (not shown). In practice, when container 9 is mounted in clamp means 8, its open end is arranged approximately flush with the end 23 of the base plate so that bottom 22 is directed toward the opposite end of said base plate. The clamp means shown will accommodate cylindrical, hexagonal or octagonal containers. For rectangular containers, said means may be formed accordingly.

The element 11 comprises an elongated member 24 to one end of which is affixed a pusher plate 25. Member 24 may be variously formed. As shown, the same is formed with four arms 26 arranged symmetrically about a common center, having a cross-section that resembles a plus sign. The number of said arms may vary and, according to their number, guides 15 are provided with guideways 27 engaged with two oppositely arranged arms 26, whereby member 24 is adapted to move longitudinally.

So that predetermined thicknesses of slices may be had, each arm 26 is formed with a different number of differently spaced notches 28 as can be seen from the drawing. The larger the notch spacing the fewer and thicker will be the slices.

Since member 24 can be introduced into guideways 27 endwise, the arm with a desired number of notches can be arranged to extend outwardly. Thus, easy thickness selection is afforded.

In order that guides 15 be as low as practicable, it is not necessary that member 24 be axially aligned with container 9 although such alignment may be arranged, if desired. In the form shown, axial alignment of pusher plate 25 for any position of the arms 26 may be achieved by rotating said plate on pivot screw 29 accordingly. Since plate 25 is mounted eccentrically, it is a simple matter to first set said plate according to the arm that extends outward so that the plate and container are coaxial.

The means 12 comprises a frame having spaced parallel arms 30 that are connected by pivots 31 to base ears 14, at one end, and by a handle 32, at the other end. In order to clear container 9, said arms 30 are provided with extensions 33, the handle extending transversely between said extensions. Across the free end of the frame there extends a cutter 34, in this case shown as a wire which is anchored at one end to one arm 30 and connected to a knob 35 carried by the other arm 30, the wire simply spanning between arms 30. Said wire is secured to the shank of said knob, said shank being seated in a bore provided in the latter frame arm 30. Since the knob shoulders on the outer portion of said latter arm, the wire is rigidly supported between its anchored end and said knob shank.

The means 12 further includes a bail-like member 36 that is pivoted at 37 to arms 30 and resides therebetween. Said member 36 is a free-swinging bail that, at its free end is provided with a transverse section 38. When the present device is to be used in a horizontal position, gravity may be depended on to assure operative engagement of end 38 with the outwardly directed notches 28. However, for the vertical position shown, a suitable torsion spring 39 may be provided at one pivot 37 to swing bail 36 in a direction toward said notches.

It will be noted that each arm 26 is provided with an additional notch 40 between notches 28 and pusher plate 25. Said notch 40 is downwardly directed. By engaging bail end section 38 in the notch 40 that is in the outwardly extending arm 26, element 11 is held retracted so that plate 25 is clear of clamp means 8 so that a container may be mounted therein.

In operation, after a container is positioned in the device, bail 36 is moved to release element 11 so that the plate 25 thereof will fall to rest against container bottom 22. Means 12 is swung outward until bail end 38 falls into the first notch 28. Then, by holding a receptacle beneath container 9 and pushing inward on handle 32, the bail projects element 11 to cause bottom 22 to be displaced inwardly and extrusion of ice cream from the container. While pivots 37 move in an arc about pivots 31, bail end section 38 moves in a straight line and imparts straight-line movement to element 11. It will be noted that for the first part of the movement of means 12, wire cutter 34 merely approaches ice cream 10 while the same is being extruded. Then, as pivots 31 and 37 and bail end section 38 approach alignment, said wire cutter begins to slice through the ice cream adjacent the open end of the container. During the final movement of means 12, the cutter, in a shallow arc, slices the ice cream while the element 11 is substantially at rest as pivots 37 move from one side of a straight line connecting pivots 31 and end 39 to the opposite side. There is, therefore, an infinitesimal projection movement of element 11 after slicing begins that modifies the arcuate cut made. For all practical purposes, however, the cutter slices after extrusion of the ice cream and when such extrusion is terminated.

A second slice is obtained by repeating the operation, the bail end 38 now engaging the second notch 28. Thus, successive slices are obtained, all being substantially alike. It will be evident that, by a simple manual swinging actuation of means 12, first, ice cream is extruded and then the extruded portion is severed from the bulk thereof in the container.

Although not shown, a suitable stop may be provided to limit the projected position of element 11 to prevent the same from leaving the guideways 27.

While the invention that has been illustrated and described is now regarded as the preferred embodiment, the construction is, of course, subject to modifications without departing from the spirit and scope of the invention. It is therefore not desired to restrict the invention to the particular form of construction illustrated and described, but to cover all modifications that may fall within the scope of the appended claims.

Having thus described the invention, what is claimed and desired to be secured by Letters Patent is:

1. A slicing device comprising a holder for a container of material to be sliced, said container having an inwardly displaceable bottom, an elongated element having an end engaged with said bottom and provided with a series of longitudinally spaced notches, pivoted means swingable relative to said element and container and having a cutter rigidly supported on the free end thereof, and a bail pivoted on the pivoted means on a pivot parallel to the pivot of said means and intermediate the pivot of said means and the cutter thereon and having its outer end engageable with said series of notches, whereby, upon initial swinging movement of the pivoted means, said bail projects the elongated member while the cutter approaches the material being extruded and said cutter slices through the extruded material during the final portion of movement of the pivoted member.

2. A device according to claim 1 in which the longitudinal element is vertically arranged and in which a spring is provided to urge the free end of the bail in a direction to engage the notches in said elongated element.

3. A device according to claim 1 in which the longitudinal element and the container holder are offset axially, and an adjustable pusher plate is provided on said element to engage the container bottom, said plate being eccentrically carried by the elongated element.

4. A slicing device according to claim 1: the holder for the container comprising a slitted sleeve provided with latch means to clamp the sleeve tightly over the container to, thereby, hold said container fixed during inward displacement of the bottom thereof.

References Cited in the file of this patent

UNITED STATES PATENTS

| Number | Name | Date |
|---|---|---|
| 656,044 | Pinkerton | Aug. 14, 1900 |
| 1,187,561 | Sorensen | June 20, 1916 |
| 1,360,572 | Palmer | Nov. 30, 1920 |
| 2,135,113 | Rohbein | Nov. 1, 1938 |